(12) United States Patent
Zhao et al.

(10) Patent No.: US 7,896,957 B2
(45) Date of Patent: Mar. 1, 2011

(54) AIR PURIFIER

(75) Inventors: Bing Zhao, Shenzhen (CN); Ming-Jen Wang, Shenzhen (CN); Junsui Wang, Shanzhen (CN)

(73) Assignee: Shenzen Qibin Enterprises, Shenzhen (CN)

( * ) Notice: Subject to any disclaimer, the term of this patent is extended or adjusted under 35 U.S.C. 154(b) by 0 days.

(21) Appl. No.: 12/630,600

(22) Filed: Dec. 3, 2009

(65) Prior Publication Data

US 2010/0077924 A1    Apr. 1, 2010

Related U.S. Application Data

(63) Continuation of application No. PCT/CN2008/072945, filed on Nov. 15, 2008.

(30) Foreign Application Priority Data

Apr. 15, 2008 (CN) .................. 2008 2 0093342 U

(51) Int. Cl.
*B03C 3/36* (2006.01)
(52) U.S. Cl. .................... 96/63; 96/67; 96/83; 96/96
(58) Field of Classification Search .............. 96/39, 96/41, 63, 66, 67, 83–85, 94, 96
See application file for complete search history.

(56) References Cited

U.S. PATENT DOCUMENTS

| | | | | |
|---|---|---|---|---|
| 4,978,372 A | * | 12/1990 | Pick | 96/67 |
| 6,764,533 B2 | * | 7/2004 | Lobiondo, Jr. | 96/66 |
| 7,132,010 B2 | * | 11/2006 | Carlsson | 96/55 |
| 7,244,290 B2 | * | 7/2007 | Vandenbelt et al. | 96/63 |
| 7,258,715 B2 | * | 8/2007 | Cox et al. | 55/422 |
| 7,332,019 B2 | * | 2/2008 | Bias et al. | 96/15 |
| 7,621,984 B2 | * | 11/2009 | Cowie et al. | 96/41 |
| 7,717,984 B1 | * | 5/2010 | Schreiber | 96/30 |
| 2006/0180023 A1 | * | 8/2006 | Coppom et al. | 95/59 |
| 2007/0039472 A1 | * | 2/2007 | Bias et al. | 96/66 |
| 2008/0134896 A1 | * | 6/2008 | Holmes et al. | 96/18 |
| 2008/0314250 A1 | * | 12/2008 | Cowie et al. | 96/86 |

FOREIGN PATENT DOCUMENTS

| | | |
|---|---|---|
| CN | 2152173 Y | 1/1994 |
| JP | 2001-201088 A | 7/2001 |

OTHER PUBLICATIONS

PCT International Search Report of PCT/CN2008/072945.

* cited by examiner

*Primary Examiner*—Richard L Chiesa
(74) *Attorney, Agent, or Firm*—Hamre, Schumann, Mueller & Larson, P.C.

(57) ABSTRACT

An air purifier includes a shell with an air inlet and an air outlet. An electric field filter, an air passage and a blower are disposed inside the shell. The electric field filter includes a filter frame disposed at the air outlet and a grid base disposed under the filter frame. A filter is provided inside the filter frame. One end of the air passage connects with the grid base and the other end connects with the blower. The blower is disposed at the air inlet. The filter frame and the grid base are integrated as a hermetic whole. Due to the integrated configuration of the filter frame and the grid base, when removing out the electric field filter, the power is cut automatically. This effectively prevents an occurrence of the electroshock, and improves safety performance of the purifier. Furthermore, air leakage can be greatly reduced, for there is no gap between the filter frame and the grid base.

6 Claims, 6 Drawing Sheets

221

AIR PURIFIER

TECHNICAL FIELD

The present invention relates to air purification techniques and, more particularly, to an air purifier.

BACKGROUND

With an increasing improvement of demand for life quality of people, how to purify the air environment becomes an important problem to be solved. Air purifiers and disinfectors are presented to resolve this problem. The air purifiers can purify or reduce the impurity, dust and other harmful substances in the air, and the disinfectors can kill the microorganism such as germs and bacteria in the air.

At present, the air purifiers mainly include common filtration purifiers and electronic dedusting machines. The common purifiers accomplish filtering action by fixing a filter at an air inlet. The filtering effect greatly depends on selected filter material. Generally, the filters mostly are low efficient filters or some middle efficient filters in the market, the effects of which are very poor. In the electronic dedusting machines, air passes a high voltage electrostatic plate, and then the dust accumulates on the electrostatic plate by high voltage absorption. The effect is even poorer than low efficient level. According to the different ways of disinfection, the disinfectors have various types, such as Ozone disinfectors, UV light disinfectors, photocatalyst disinfectors, etc. The fore two types require that people can't stay in disinfecting scene.

Air purification should comprise two steps, i.e., dedusting and disinfection. However, a traditional air purifier can clean impurity in the air, but cannot achieve an optimal filtering effect, thereby failing to efficiently disinfect the air. The disinfector can efficiently disinfect the air, but can't perform a dedust action. Therefore, all the above machines can't roundly purify the air.

Recently, a new air purifier is proposed to dedust and disinfect the air. The purifier includes a power connection component, an air blower electrically connected to the power component, an ionization assembly engaging with the air blower, a first control grid electrically connecting with the power component, and a high voltage grid connected to the power component. The purifier further includes a primary filtering assembly hermetically and detachably engaging with the ionization assembly. The primary filtering assembly includes a filtering septum and a second control grid. The engagement of the primary filtering assembly and the ionization assembly produces a first ionizing field between the first control grid and the second control grid, and a second ionizing field between the high voltage grid and the second control grid.

Although the new air purifier can dedust and disinfect the air, because of independence between the ionization assembly and primary filtering assembly, the purifier has some main defections as below: firstly, this independence greatly reduces the safety performance of the product, because when removing the primary filtering assembly, the ionization assembly is still subject to a high voltage, and safety of the users will be seriously threatened; secondly, a gap is formed between the ionization assembly and the primary filtering assembly, which unavoidably brings out air leakage problem; thirdly, insulation ability of the ionization assembly will be reduced since the ionization assembly are used for a long term but cannot be replaced, accordingly forming alluvial dust thereon. The alluvial dust will cause not only secondary pollution, but also high voltage discharge and other adverse consequences. At last, exposed connection of high voltage of the ionization assembly will bring about potential troubles for maintenance and replacement.

SUMMARY

An object of the present invention is to provide an air purifier, which has a good safety performance and a reduced air leakage.

In accordance with an embodiment of the present invention, an air purifier is provided to achieve the above object, which comprises a shell with an air inlet and an air outlet, an electric field filter, a blower and an air passage. The electric field filter is disposed inside the shell. The electric field filter comprises a filter frame disposed at the air outlet and a grid base disposed under the filter frame. A filter is provided in the filter frame. The filter frame and the grid base are integrated as a hermetic whole. The blower is disposed inside the shell and at the air outlet inlet. The air passage is disposed inside the shell and has one end connecting with the grid base and the other end connecting with the blower.

In such a configuration described above, because the filter frame and the grid base are integrated as a hermetic whole, when removing out the electric field filter, the power is cut automatically. This effectively prevents an occurrence of the electroshock, and improves safety performance of the purifier. Furthermore, air leakage can be greatly reduced, for there is no gap between the filter frame and the grid base.

DRAWINGS

DETAILED DESCRIPTION

Figure 1:
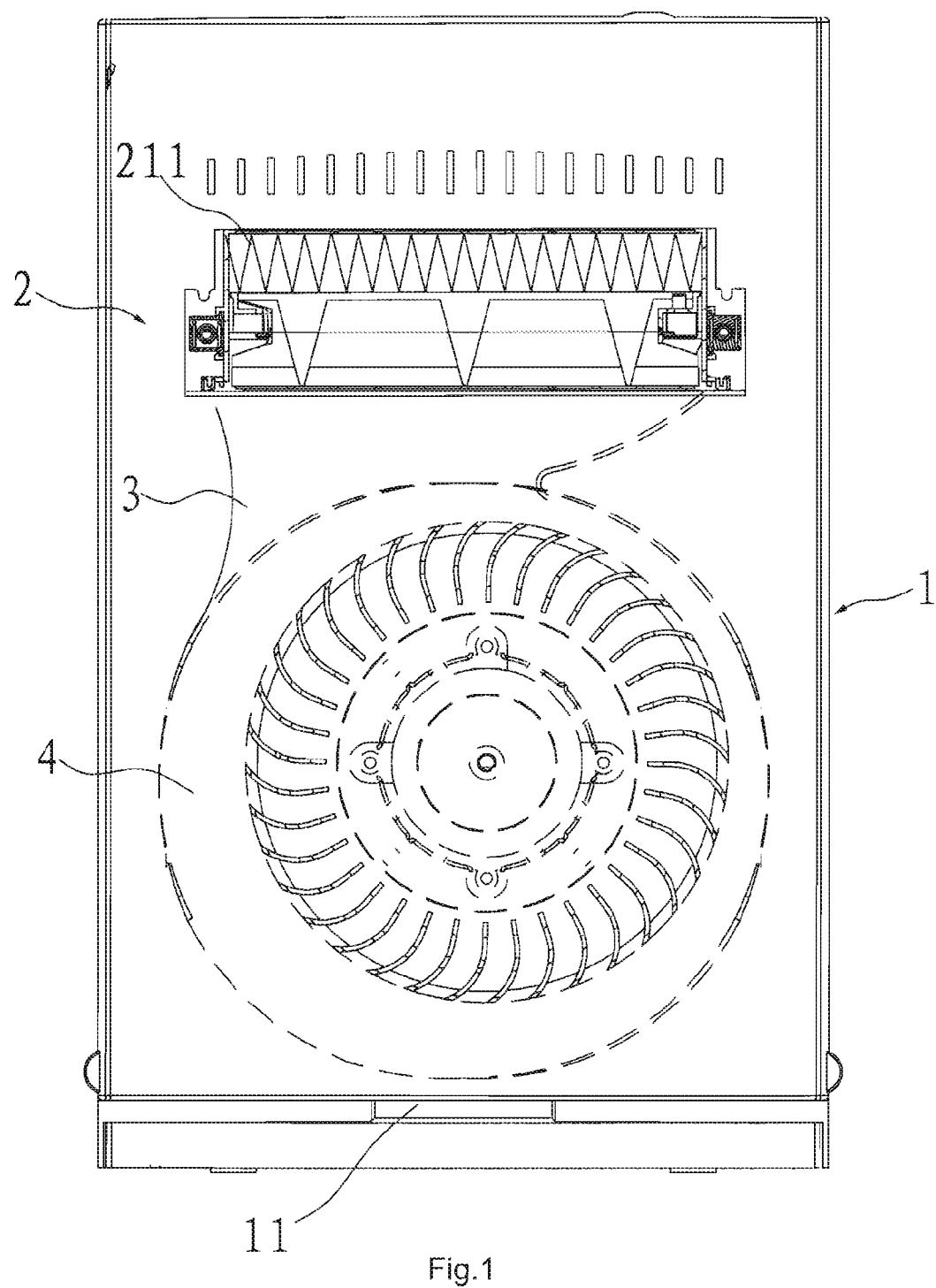
FIG. 1 is a side view of an air purifier in accordance with a preferred embodiment of the present invention.
Figure 2:
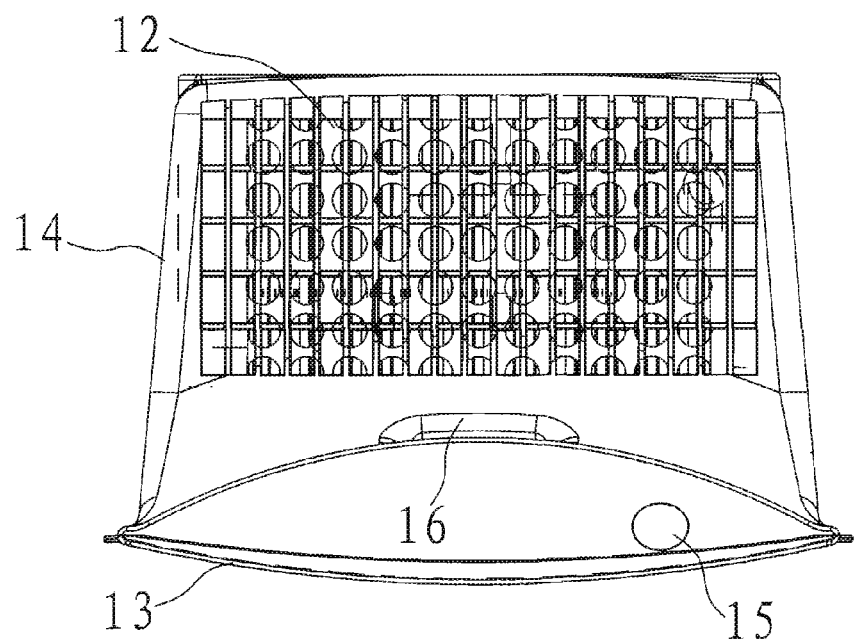
FIG. 2 is a top view of the air purifier in FIG. 1.

Objects, advantages and embodiments of the present invention will be explained below in detail with reference to the accompanying drawings. However, it is to be appreciated that the following description of the embodiment(s) is merely exemplary in nature and is no way intended to limit the invention, its application, or uses.

FIG. 1 to FIG. 8 illustrates an air purifier in accordance with a preferred embodiment of the present invention. The air purifier includes a shell 1 with an air inlet 11 and an air outlet 12. An electric field filter 2, an air passage 3 and a blower 4 are disposed in the shell 1.

With reference to FIG. 1, the electric field filter 2 comprises a filter frame 21 and a grid base 22. The filter frame 21 is disposed at air outlet 12 and a filter 21 is disposed in the filter frame 21. The grid base 22 is disposed under the filter frame 21. One end of the air passage 3 connects with the filter frame 21, and the other end connects with the blower 4. The blower 4 is disposed at the air inlet 11. The filter frame 21 and the grid base 22 are integrated as a hermetic whole. Further referring to FIG. 2, the shell 1 is advantageously a combination of a front shell 13 and a behind shell 14. A press button 15 is disposed on the top of the shell 1. Optionally, a lift groove 16 is provided at the top of the shell 1, for conveniently carrying the purifier.

In this configuration, because the filter frame and the grid base are integrated as a hermetic whole, when removing out the electric field filter, the power is cut automatically. This effectively prevents an occurrence of the electroshock, and improves safety performance of the purifier. Further, it's more convenient in exchanging the electric field filter 2, and can replace the whole electric field filter 2 at a time. Additionally, air leakage problem is greatly reduced, for there is no gap between the filter frame 21 and the grid base 21

Figure 3:
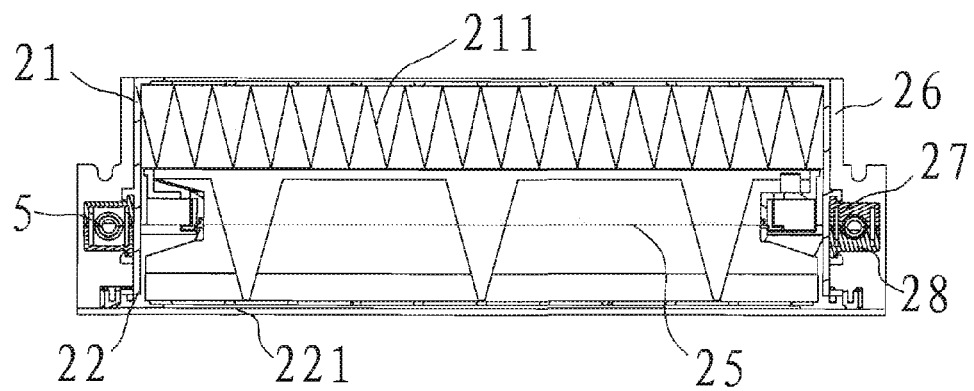
FIG. 3 is a partial cutaway, side view of an electric filter of the air purifier in FIG. 1.
Figure 4:
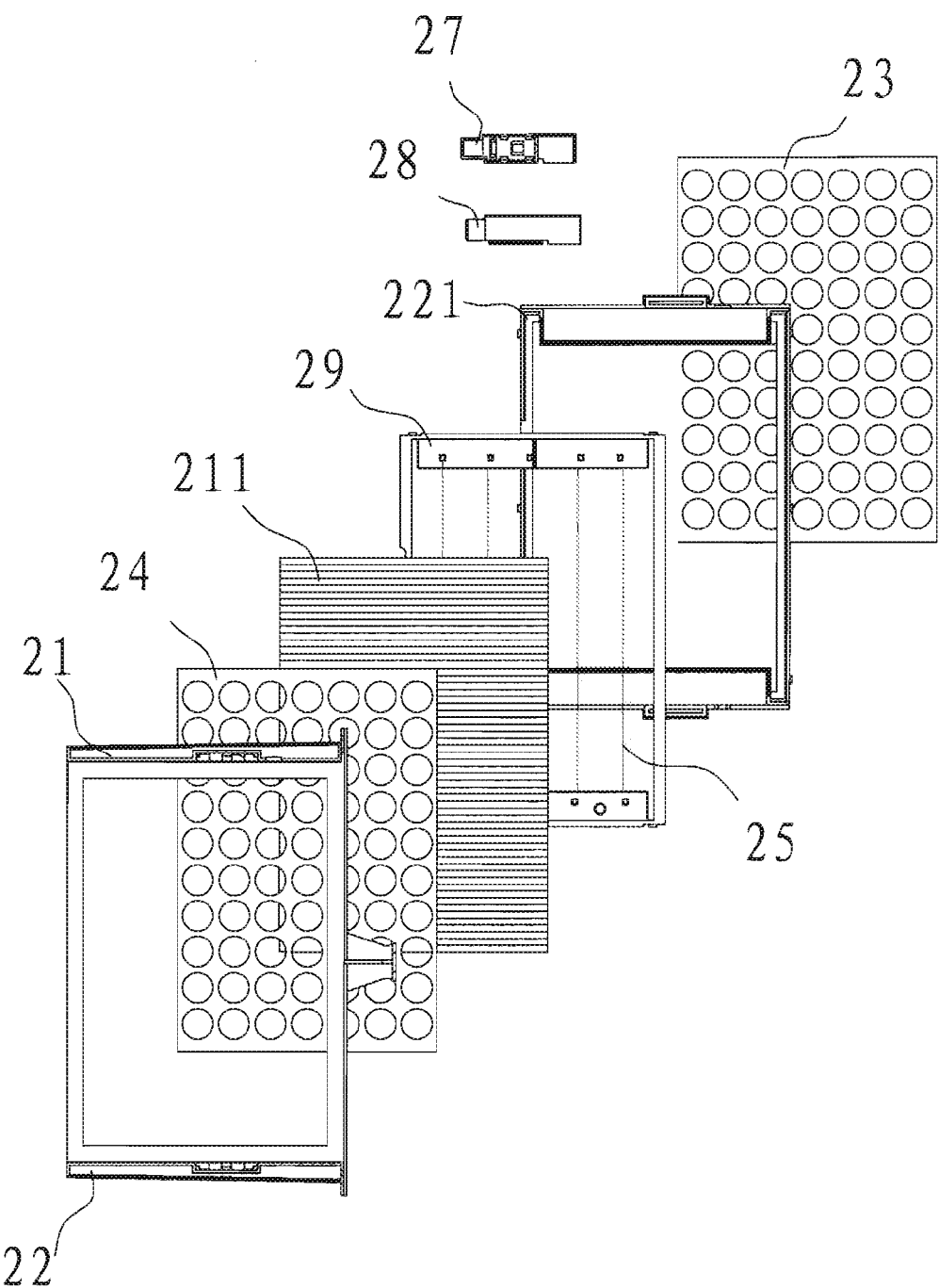
FIG. 4 is a disassembled, isometric view of inner structure of the electric filter in FIG. 1.
Figure 5:
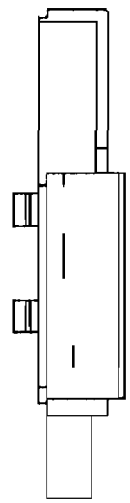
FIG. 5 is a side view of connector upper and lower shells of the air purifier in FIG. 1.
Figure 5:
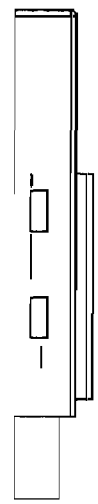

With reference to FIG. 3 and FIG. 4, an exemplary electric field filter 2 is illustrated. The electric field filter 2 includes an upper shield mesh 23, a lower shield mesh 24 and a row of high voltage discharge filaments 25. The row of high voltage discharge filaments 25 and the filter 211 are both interposed between the upper and lower shield meshes 23 and 24. The filter 211 is interposed between the row of high voltage discharge filaments 25 and the upper shield mesh 23. Specifically, two high voltage connectors 5 are provided at two sides of the electric field filter 2. The high voltage connectors 5 are connected to opposite ends of each high voltage discharge filament 25 to introduce high voltage therein. Therefore, when high voltage discharge filaments 25 between the upper and lower shield meshes 23, 24 are provided with high voltage by the high voltage connector 5, a strong electric field is formed. This not only enhances the filtering effect of fiber filtering paper in electric field, and also can disinfect the bacteria and viruses with the electric field.

Figure 7:
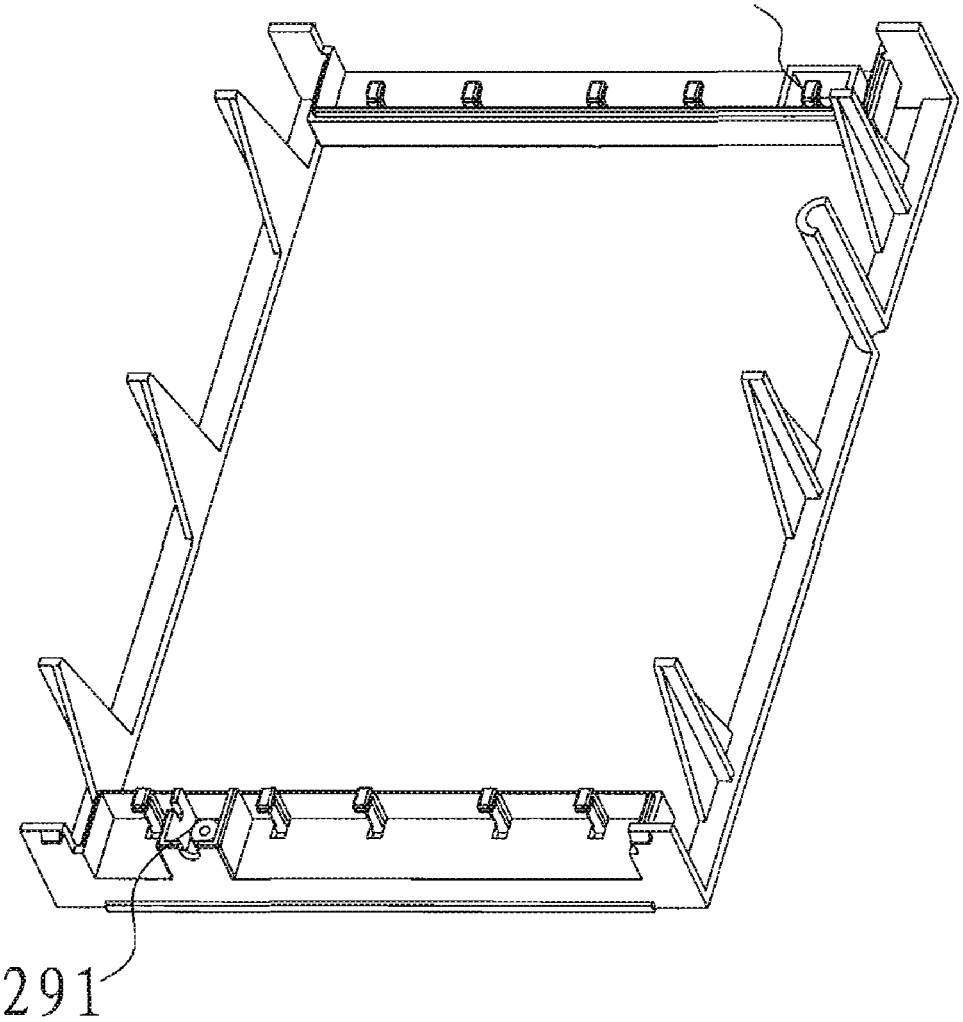
FIG. 7 is a perspective view of a discharge filament fixed frame in FIG. 1.
Figure 8:
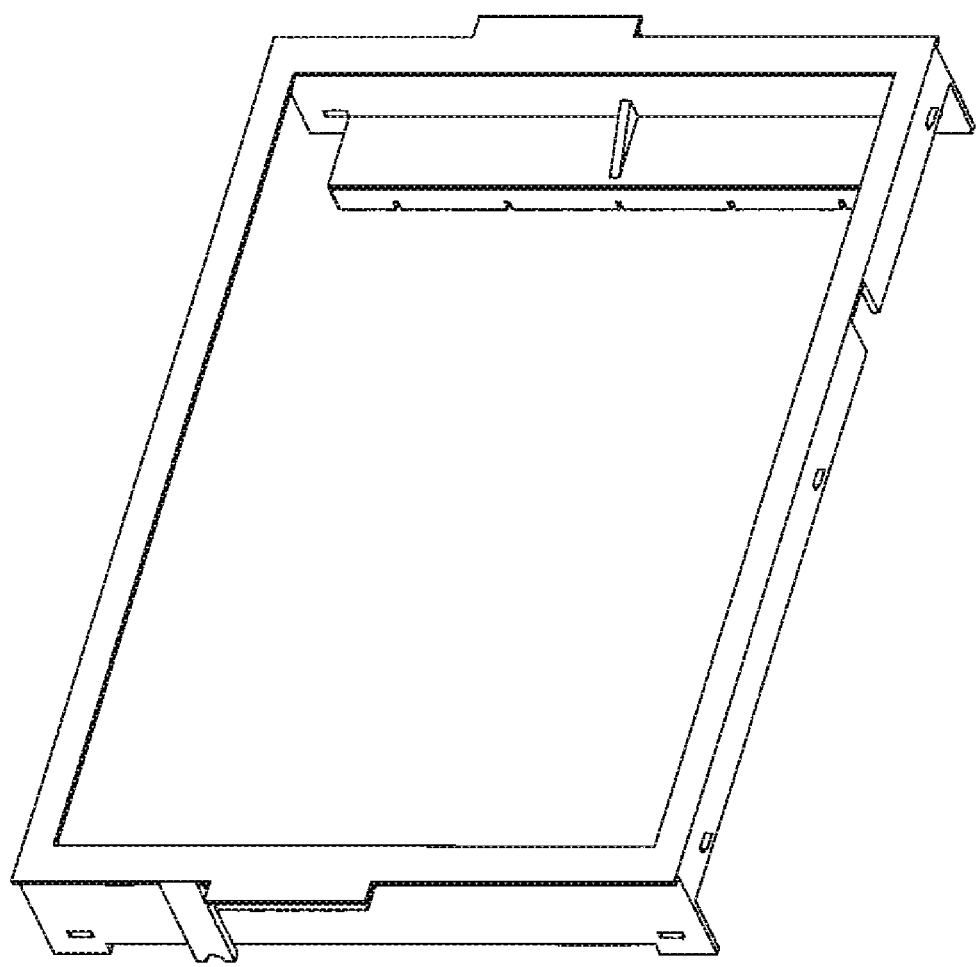
FIG. 8 is a perspective view of a lower fixed plate in FIG. 1.

With reference to FIG. 4, FIG. 7 and FIG. 8, the electric field filter 2 further comprises a discharge filament fixed rack 29 and a lower fixed plate 221. The discharge filament fixed rack 29 is disposed in the gird base 22 and the high voltage discharge filaments 25 are fixed on the discharge filament fixed rack 29. Glue pouring parts 291 are provided at two ends of the discharge filament fixed rack 29 so that glue can be poured into the parts 291 to seal thrums of the high voltage discharge filaments 25, thereby preventing the thrums from discharging. The lower fixed plate 221 is disposed under the grid base 22 to reinforce. The upper and lower shield meshes 23, 24 are electrically connected to each other by copper sheets 26. The filter 211 is preferably a fiber filtering paper folded with a wave form and the high discharge filaments 25 can be chosen from kinds of products generally used in the art, for example tungsten filaments in this embodiment.

Figure 6:
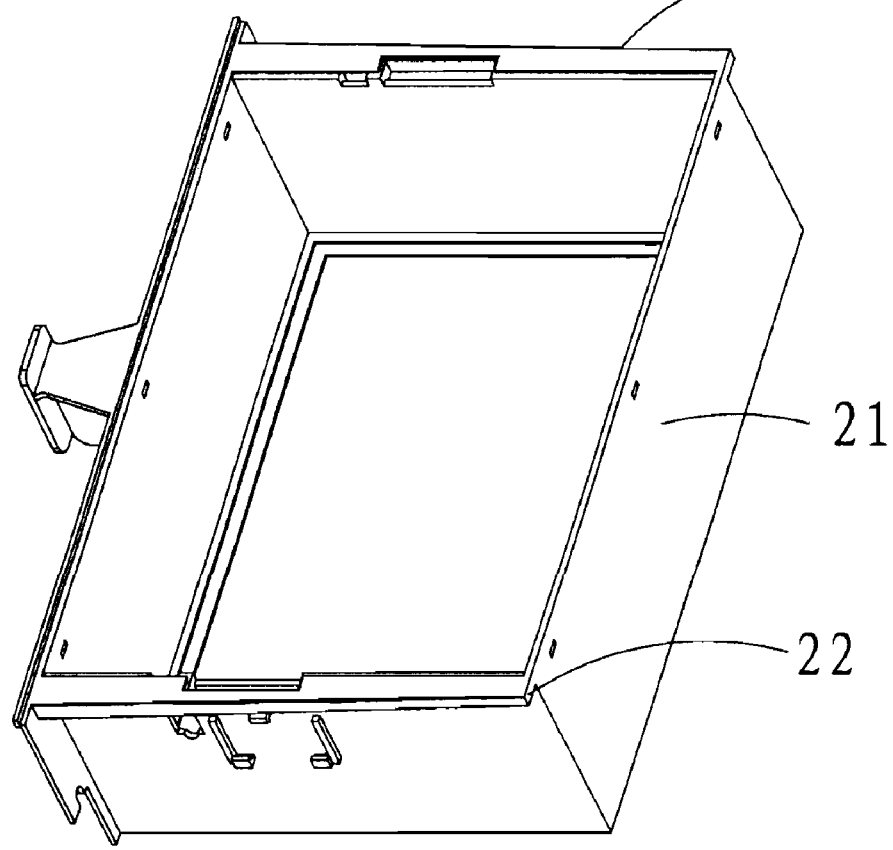
FIG. 6 is a perspective view of integrated configuration of the filter frame and the grid base of the air purifier in FIG. 1.

With reference to FIG. 3 and FIG. 6, as further improvement of the above embodiment, a connector upper shell 27 is applied outside the electric field filter 2. The shell 1 has a connector lower shell 28, for matching the connector upper shell 27. The connector upper shell 27 is electrically connected to the high voltage discharge filaments 25. Accordingly, the high voltage wires are connected to each other inside the seal space between the connector upper and lower shells 27, 28. This improves both safety performance and stability of connection. Further, in order to avoid fire hazard brought from discharge, the connector upper and lower shells 27, 28 can be made of refractory materials.

With reference to FIG. 6, lateral of a combined frame of the filter frame 21 with the grid base 22 is formed with wedges 212, and the shape of shell 1 is configured to be matched with the combined frame. In this way, this configuration provides good guidance for installing, and also efficiently improves the leak tightness of product, thereby decreasing the air leakage.

The described embodiments are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. An air purifier, comprising:
a shell with an air inlet and an air outlet;
an electric field filter disposed inside the shell, the electric field filter comprising:
a filter frame disposed at the air outlet;
a filter provided in the filter frame; and
a grid base disposed under the filter frame;
wherein the filter frame and the grid base are integrated as a hermetic whole;
a blower disposed inside the shell and at the air inlet; and
an air passage disposed inside the shell, the air passage having one end connecting with the grid base and the other end connecting with the blower,
wherein the electric field filter further comprises an upper shield mesh, a lower shield mesh and a high voltage discharge filament, the high voltage discharge filament and the filter being interposed between the upper and lower shield meshes, and
wherein a high voltage connector is disposed outside the high voltage filter, a connector upper shell being provided outside the high voltage connector, a connector lower shell matching with the connector upper shell, the connector lower shell being disposed on the shell.

2. The air purifier of claim 1, wherein laterals of the filter frame and the grid base are in a wedge shape.

3. The air purifier of claim 1, wherein the connector upper and lower shells are made of refractory insulating materials.

4. The air purifier of claim 1, wherein the filter is a fiber filtering paper folded into a wave shape.

5. The air purifier of claim 1, wherein the high voltage discharge filament is a tungsten filament.

6. An air purifier, comprising:
a shell with an air inlet and an air outlet;
an electric field filter disposed inside the shell, the electric field filter comprising:
a filter frame disposed at the air outlet;
a filter provided in the filter frame; and
a grid base disposed under the filter frame,
wherein the filter frame and the grid base are integrated as a hermetic whole;
a blower disposed inside the shell and at the air inlet; and
an air passage disposed inside the shell, the air passage having one end connecting with the grid base and the other end connecting with the blower,
wherein the electric field filter further comprises an upper shield mesh, a lower shield mesh and a high voltage discharge filament, the high voltage discharge filament and the filter being interposed between the upper and lower shield meshes, and
wherein the upper and lower shield mesh are electrically connected to each other by a copper sheet.

* * * * *